(12) United States Patent
Kusaka et al.

(10) Patent No.: US 8,294,984 B2
(45) Date of Patent: Oct. 23, 2012

(54) MICROSCOPE

(75) Inventors: Kenichi Kusaka, Tokyo (JP); Yoshiharu Saito, Tokyo (JP)

(73) Assignee: Olympus Corporation, Tokyo (JP)

( * ) Notice: Subject to any disclaimer, the term of this patent is extended or adjusted under 35 U.S.C. 154(b) by 564 days.

(21) Appl. No.: 12/470,635

(22) Filed: May 22, 2009

(65) Prior Publication Data

US 2009/0296209 A1 Dec. 3, 2009

(30) Foreign Application Priority Data

May 27, 2008 (JP) ................................ 2008-138209

(51) Int. Cl.
*G02B 21/06* (2006.01)
(52) U.S. Cl. ........................................ 359/385; 359/739
(58) Field of Classification Search .................. 359/362, 359/385, 387, 739–741
See application file for complete search history.

(56) References Cited

U.S. PATENT DOCUMENTS

| | | | |
|---|---|---|---|
| 5,442,487 A * | 8/1995 | Mizuno .......................... | 359/784 |
| 5,612,818 A * | 3/1997 | Kumagai et al. .............. | 359/385 |
| 5,729,385 A * | 3/1998 | Nishida et al. ................ | 359/434 |
| 6,212,005 B1 * | 4/2001 | Kawasaki et al. ............. | 359/388 |
| 6,426,835 B1 * | 7/2002 | Endo et al. ..................... | 359/388 |
| 6,643,061 B2 * | 11/2003 | Osa et al. ....................... | 359/385 |
| 6,809,861 B2 * | 10/2004 | Kawasaki et al. ............. | 359/385 |
| 7,391,565 B2 * | 6/2008 | Lauer ............................. | 359/368 |
| 7,567,346 B2 | 7/2009 | Fomitchov et al. | |
| 7,787,179 B2 * | 8/2010 | Lippert et al. ................. | 359/385 |
| 2002/0036824 A1 * | 3/2002 | Sasaki ........................... | 359/385 |
| 2002/0141051 A1 * | 10/2002 | Vogt et al. ..................... | 359/385 |
| 2002/0191281 A1 * | 12/2002 | Osa et al. ....................... | 359/385 |
| 2004/0125459 A1 * | 7/2004 | Tanitsu et al. ................. | 359/619 |
| 2005/0231799 A1 * | 10/2005 | Kawasaki et al. ............. | 359/385 |
| 2006/0291039 A1 * | 12/2006 | Eda et al. ....................... | 359/362 |
| 2007/0063153 A1 | 3/2007 | Widzgowski et al. | |
| 2007/0268574 A1 * | 11/2007 | Sasaki ........................... | 359/385 |

FOREIGN PATENT DOCUMENTS

| | | |
|---|---|---|
| JP | 06-2340092 A | 8/1994 |
| JP | 7-185863 A | 7/1995 |
| JP | 11-309595 A | 11/1999 |
| JP | 2006-220953 A | 8/2006 |
| JP | 2007-304421 A | 11/2007 |
| WO | WO 2007/103642 A | 9/2007 |

OTHER PUBLICATIONS

Japanese Office Action dated Aug. 21, 2012 issued in counterpart Japanese Application No. 2008-138209.

* cited by examiner

*Primary Examiner* — Frank Font
(74) *Attorney, Agent, or Firm* — Holtz, Holtz, Goodman & Chick, PC

(57) ABSTRACT

A microscope includes a laser light source, an optical system which changes a beam diameter, and a field stop disposed at a position conjugating with a sample plane, in this order beginning from the side of the laser light source. In this microscopes the following conditional equation is satisfied: $A \leqq D/2$ where "A" is the diameter of the field stop, and "D" is the diameter of light incident to the field stop.

9 Claims, 4 Drawing Sheets

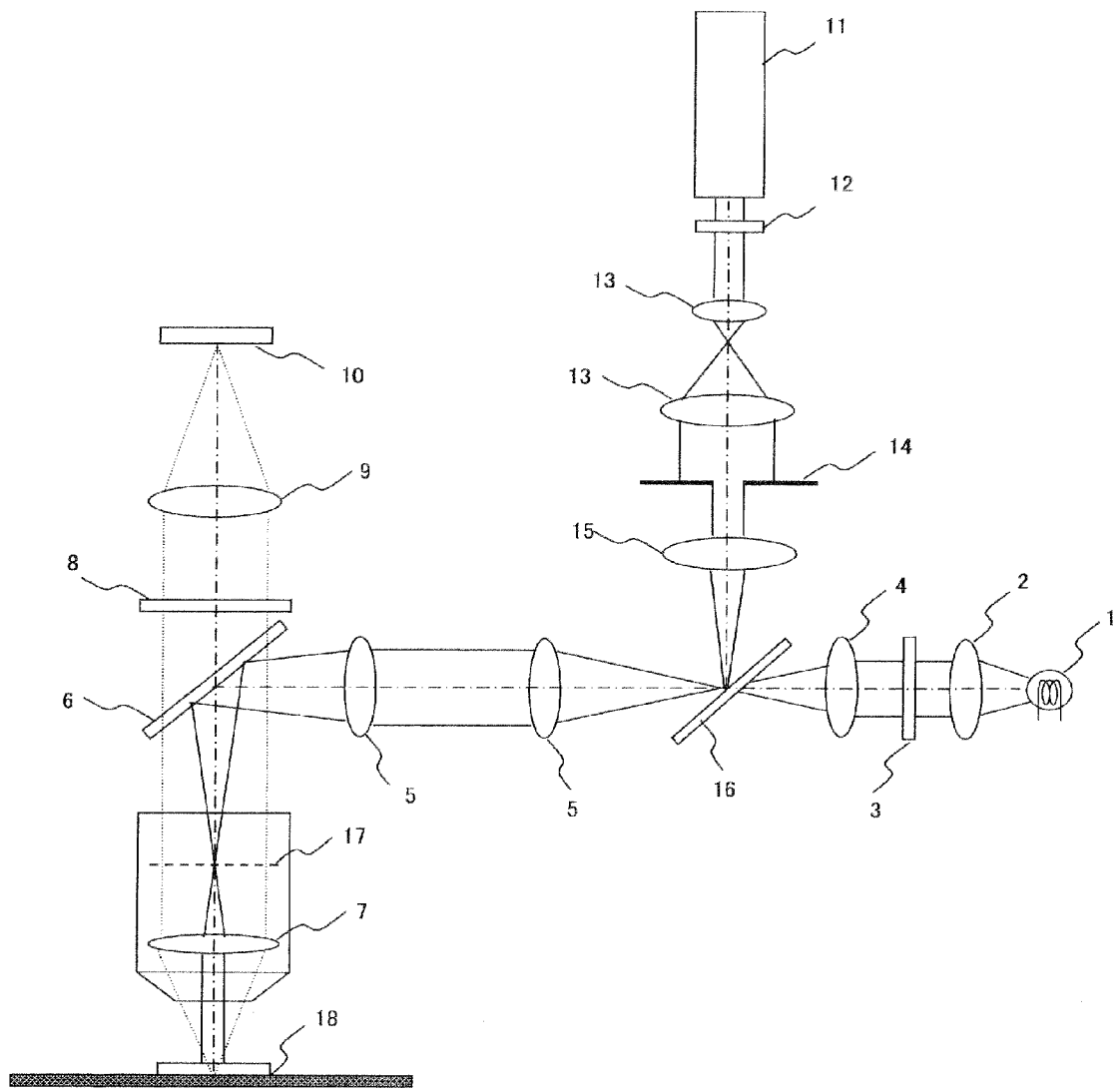
F I G. 1

MICROSCOPE

CROSS REFERENCE TO RELATED APPLICATIONS

This application claims benefit of Japanese Application No. 2008-138209, filed May 27, 2008, the contents of which are incorporated by this reference.

BACKGROUND OF THE INVENTION

1. Field of the Invention

The present invention relates to the techniques of microscopes.

2. Description of the Related Art

In recent years, instead of an ordinary white light source, a laser light source is often used in microscopes. In such cases, the laser light source is usually used for the purpose of observing a sample while precisely controlling the position or area of irradiation, not for the purpose of simply irradiating the sample. Microscopes such as laser scanning microscopes are known to be used for this purpose.

In laser scanning microscopes, the irradiation area of a laser is directly relevant to the resolution. For this reason, it is very important to precisely control the laser light.

Furthermore, there are some cases in which the laser light is used for the purpose of stimulation of the sample, not for the purpose of observation. This is known as "light stimulation", and it has been an important method in recent biological research.

Also, when laser light is used for this light stimulation, it is important to control the position or area of irradiation. In addition to that, it is required that the irradiation area be uniformly irradiated with the laser light.

A technique of irradiating a reasonably wide irradiation area with the laser light is disclosed in Japanese Application Publication No. 2007-334319. In Japanese Application Publication No. 2007-334319, an optical system for adjusting a numerical aperture is insertably and removably provided at an earlier stage of a galvanomirror. By means of that optical system, the irradiation area is adjustable. Having said that, as the laser has the intensity distribution known as the "Gaussian profile", it is difficult to uniformly irradiate the irradiation area with the method disclosed in Japanese Application Publication No. 2007-334319.

SUMMARY OF THE INVENTION

A microscope according to one embodiment of the present invention includes a laser light source, an optical system which changes a beam diameter, and a field stop disposed at a position conjugating with a sample plane, in this order beginning from the side of a laser tight source, in which the following conditional equation is satisfied:

$$A \leq D/2$$

where "A" is the diameter of the field stop, and "D" is the diameter of light incident to the field stop.

BRIEF DESCRIPTION OF THE DRAWINGS

The present invention will be more apparent from the following detailed description when the accompanying drawings are referenced.

FIG. 1 is a schematic diagram of a configuration of an upright microscope with coaxial epi-illumination according to one embodiment of the present invention.

DESCRIPTION OF THE EMBODIMENTS

Figure 2A:
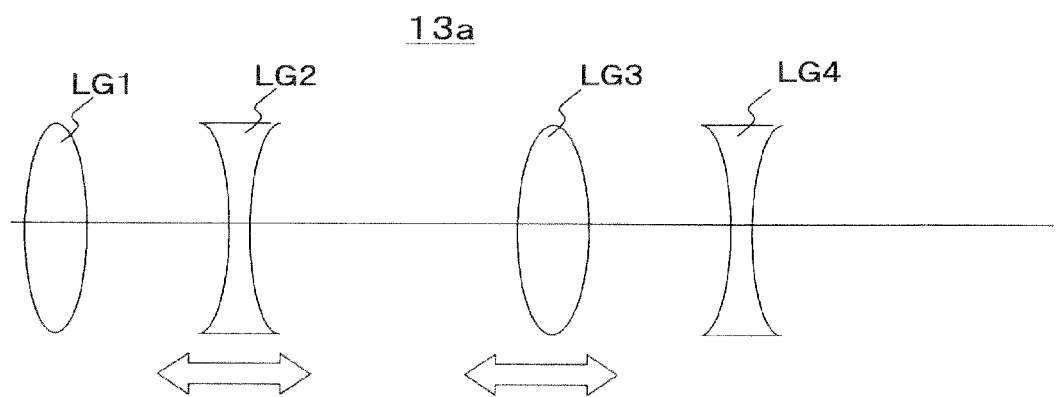
FIG. 2A is a schematic diagram exemplifying a configuration of a zoom lens included in a beam diameter changing optical system, and is a figure exemplifying an arrangement of lenses when a beam diameter is enlarged, according to one embodiment of the present invention.

Embodiments of the present invention will now be described in detail with reference to the accompanying drawings.

First Embodiment

FIG. 1 is a schematic diagram of a configuration of an upright microscope with coaxial epi-illumination according to the present embodiment.

The upright microscope of FIG. 1 includes an epi-illumination unit, an observation optical system, and a laser introduction optical system.

The epi-illumination unit includes a light source 1, a collimator lens 2, an exciter filter 3, an illumination light condensing lens 4, and an epi-illumination projecting tube optical system 5. An illumination light path formed by the epi-illumination unit is coupled to an observation light path at a dichroic mirror 6.

The observation optical system includes an objective lens 7, a barrier filter 8, a tube lens 9, and an imaging device 10. The observation optical system may be configured for visual observations by including an eye piece unit or an eye piece instead of the imaging device 10.

The laser introduction optical system includes a laser light source 11, a shutter 12, a beam diameter changing optical system 13, a tunable stop 14, and a laser light condensing lens 15. The tunable stop 14 is a field stop in which the diameter of a stop is tunable. Alternatively, the tunable stop 14 may be an insertably and removably configured field stop. In this case, the diameter of a stop can be changed by replacing the field stop with a field stop of a different stop diameter. The light path of laser light projected from the laser introduction optical system is coupled to the illumination light path formed by the epi-illumination unit at a mirror 16. Here, the mirror 16 may be a dichroic mirror or an insertable and removable total reflection mirror. The beam diameter changing optical system 13 may be configured such that magnification can be changed by means of a zoom lens. Alternatively, the beam diameter changing optical system 13 itself may be insertably and removably configured such that the magnification can be changed by replacing the beam diameter changing optical system 13.

Figure 2B:
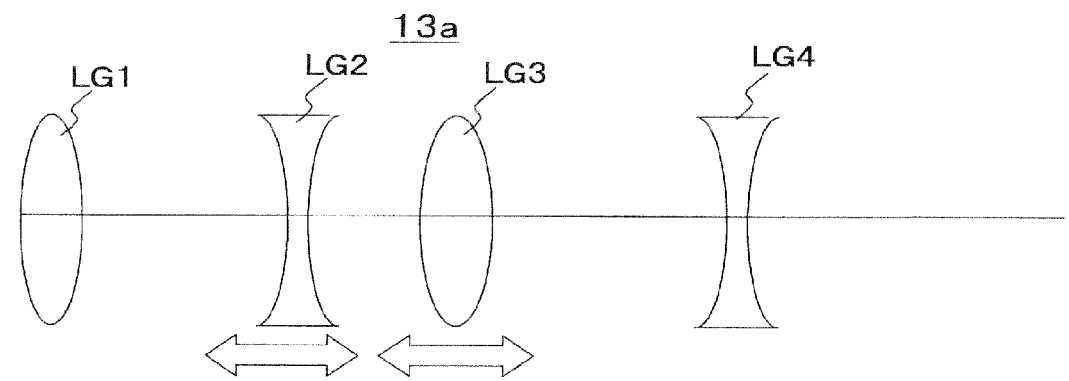
FIG. 2B is a schematic diagram exemplifying a configuration of a zoom lens included in a beam diameter changing optical system, and is a figure exemplifying an arrangement of lenses when a beam diameter is reduced, according to one embodiment of the present invention.

FIGS. 2A and 2B are schematic diagrams exemplifying a configuration of zoom lenses included in a beam diameter changing optical system. FIG. 2A exemplifies an arrangement of lenses when a beam diameter is enlarged, and FIG. 2B exemplifies an arrangement of lenses when the beam diameter is reduced. In FIGS. 2A and 2B, zoom lenses 13a include the four groups of a convex lens LG1, a concave lens LG2 that is a moving group, a convex lens LG3 that is a moving group, and a concave lens LG4. The zoom lenses of the four groups are exemplified in FIGS. 2A and 2B; however, the zoom lenses are not limited to this configuration In the epi-illumination unit, the illumination light projected from the light source 1 is converted to an approximately parallel light flux by the collimator lens 2, and the illumination light is limited to a predetermined wavelength by the exciter filter 3. Further, the illumination light is condensed to the position of the mirror 16 by the illumination light condensing Hens 4. This condensing position is relayed to a pupil position 17 of an objective lens 7 by an epi-illumination projecting tube optical system 5. That is, the present embodiment is Kohler illumination.

In the laser introduction optical system, the irradiation time of the laser light projected from the laser light source 11 is controlled by the shutter 12. For this shutter, an acousto-optical tunable element such as an acousto-optical tunable filter (AOTF) may be used. Further, the beam diameter of the laser light is changed to an appropriate beam diameter by the beam diameter changing optical system 13, and the laser light irradiates the tunable stop 14. The beam diameter changing optical system is an a focal optical system in which a collimated beam is converted to a collimated beam of a different diameter. At a subsequent stage of the tunable stop 14, the laser light condensing lens 15 is disposed. The tunable stop 14 is disposed at a front side focal point of the laser light condensing lens 15, and the mirror 16 is disposed at a back side focal point of the laser light condensing lens 15. Accordingly, as the mirror 16 is conjugated with the pupil position 17 of the objective lens 7, the tunable stop 14 is conjugated with the sample plane 18.

As the tunable stop 14 is conjugated with the sample plane 18 in the above configuration, the irradiation area on the sample plane can be varied by changing the diameter of the tunable stop 14. Also, as the mirror 16 is located at a position conjugating with the pupil position 17 of the objective lens 7, the illumination position of the laser light on the sample plane is movable by adjusting the angle of the mirror 16. Accordingly, for example, the illumination area and illumination position of the laser light can be changed while viewing an image of the sample obtained at the imaging device 10. Also, the beam diameter of the laser light is changed by the beam diameter changing optical system 13. Subsequently, in regard to the laser light having the Gaussian intensity distribution, only the area of an approximately constant intensity distribution is extracted by the tunable stop 14. Accordingly, the laser light of an approximately constant intensity distribution is irradiated onto the irradiation area. As a result, irradiation to an area and position suitable for the sample, with an almost uniform intensity on the sample plane is enabled.

Here, the following condition between beam diameter D of the laser light irradiated onto the tunable stop and diameter A of the tunable stop is preferably satisfied:

$$A < H/2 \quad (1)$$

The beam diameter D of the laser light is defined as a diameter of the laser light with the greatest $1/e^2$ intensity. Further, the following condition between the beam diameter D and the diameter A of the tunable stop is preferably satisfied:

$$A < D/(2.3) \quad (2)$$

In the present configuration, pulsed laser light may be irradiated onto the sample plane 8 by the shutter 12 periodically opening/closing. It is preferable that the light path from the laser light source be disposed appropriately by means of a mirror or the like. The laser introduction optical system may be configured to introduce a laser by means of an optical fiber or the like.

Numerical examples of the present embodiment will now be described. The epi-illumination projecting tube optical system 5 is configured in a combination of two lenses having a focal length of 180 mm, and thereby the projective magnification from the condensing position condensed by the illumination light condensing lens 4 of the epi-illumination projecting tube optical system 5 to the objective lens pupil position is 1×. Further, the focal length of the laser light condensing lens 15 is also 180 mm. In this case, a tunable stop 14 with a stop diameter of 3 mm is projected to a 50 µm area on the sample plane by a 60× objective lens 7. If a laser light with a beam diameter of 0.6 mm is used, the use of a 12× beam diameter changing optical system will magnify the beam diameter of the laser light to 7.2 mm. In this configuration, the ratio of the beam diameter irradiated onto the tunable stop to the diameter A of the tunable stop is 2.4.

Second Embodiment

Figure 3:
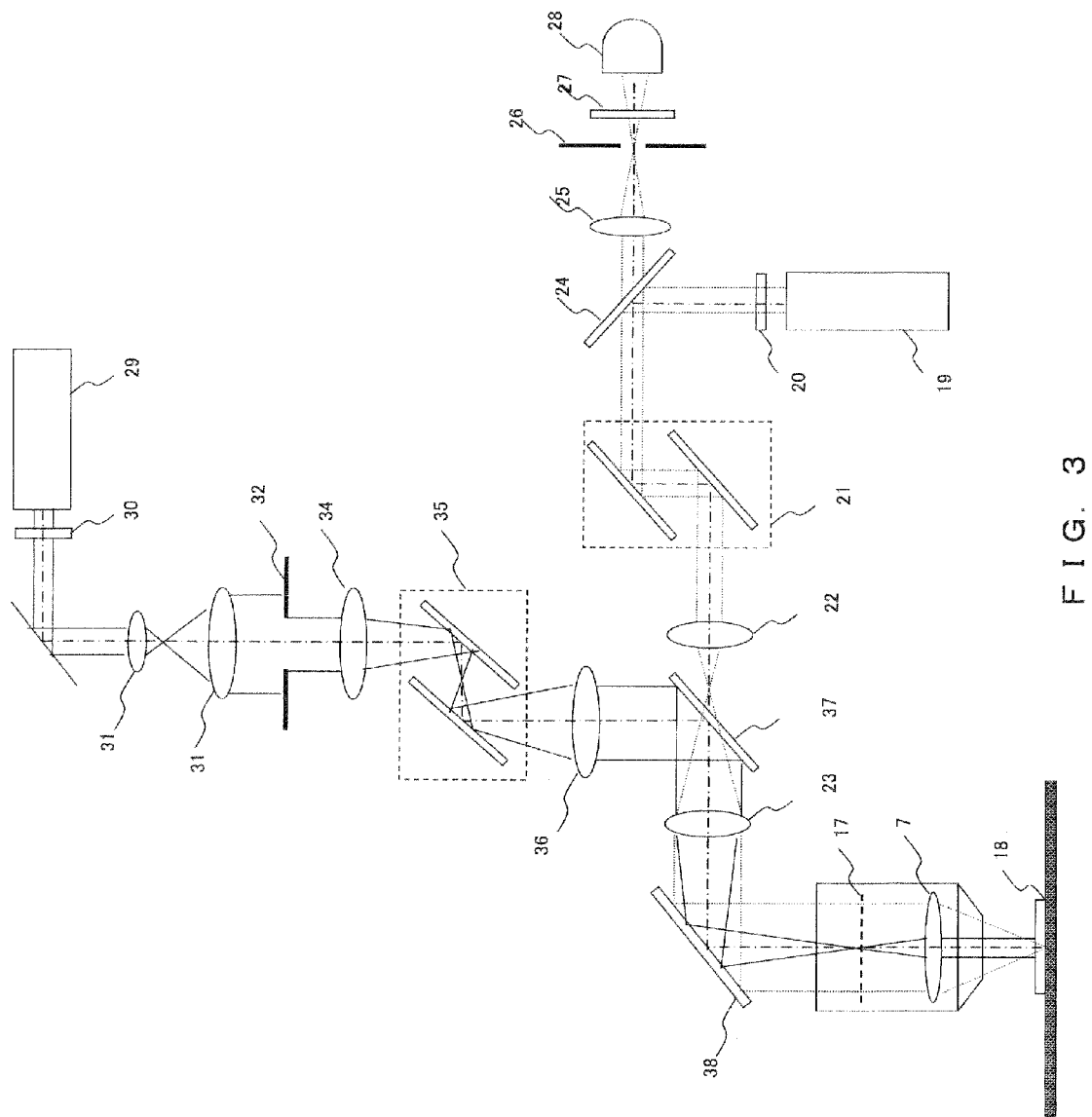
FIG. 3 is a schematic diagram illustrating a configuration of a twin-scan laser scanning microscope according to one embodiment of the present invention.

FIG. 3 is a schematic diagram illustrating a configuration of a laser scanning microscope according to the present embodiment. The present configuration includes two scanning units in which a scanning unit for observation and a scanning unit for stimulation are independently provided.

The microscope of FIG. 3 includes an observation-use laser light source 19, an observation-use shutter 20, an observation-use scanning unit 21, an observation-use pupil, projection lens 22, a tube lens 23, an objective lens 7, an excitation light-use dichroic mirror 24, a confocal lens 25, a confocal pinhole 26, a barrier filter 27, and a photodetector 28, on an observation-use light path. Here, a galvanomirror, a photoelectric deflection element or the like may be used as the observation-use scanning unit 21.

The microscope also includes a stimulation-use laser light source 29, a stimulation-use shutter 30, a beam diameter changing optical system 31, a tunable stop 32, a laser light condensing lens 34, a stimulation-use scanning unit 35, a stimulation-use pupil projection lens 36, and a stimulation-use pupil dichroic mirror 37, on a stimulation-use light path. The tunable stop 32 is a field stop in which the diameter of a stop is tunable. Alternatively, the tunable stop 32 may be an insertably and removably configured field stop. In this case, the diameter of the stop can be changed by replacing the field stop with a field stop of a different stop diameter. Also, as the stimulation-use scanning unit 35, a galvanomirror, a photoelectric deflection element, or the like may be used. The beam diameter changing optical system 31 may be configured such that magnification can be changed by means of a zoom lens. The beam diameter changing optical system 31 itself may be insertably and removably configured such that the magnification can be changed by replacing the beam diameter changing optical system 31.

The irradiation time of the laser light projected from the observation-use laser light source 19 is controlled by the observation-use shutter 20. Subsequently, the laser light is introduced to the observation-use light path by the excitation light-use dichroic mirror 24. Here, a plurality of laser light sources respectively corresponding to different wavelengths may be used for the observation-use laser light source 19. It may be configured such that the plurality of laser light sources are unified, and that the laser light is externally introduced by means of an optical fiber.

The laser light introduced to the observation-use light path is deflected by the observation-use scanning unit 21. The observation-use scanning unit 21 is disposed at a position conjugating with the pupil position 17 of the objective lens 7. Accordingly, the laser light deflected by the observation-use scanning unit 21 scans the sample plane 18. It is to be noted that the pupil position 17 of the objective lens 7 is optically conjugated with the observation-use scanning unit 21 through the observation-use pupil projection lens 22 and the tube lens 23.

A sample on the sample plane 18 to which the laser light is irradiated emits observation light. Here, the observation light is generally fluorescent light from the phosphor excited by the laser light. This observation light travels through the path of the laser light in the reverse direction, and reaches the excitation light-use dichroic mirror 24. Here, the observation light is also detected as the scanned information of the sample plane 18 as it passes through the observation-use scanning unit 21.

The observation light that reached the excitation light-use dichroic mirror 24 is separated from the laser light by the excitation light-use dichroic mirror 24, and is led to the confocal lens 25. At a back side focal point of the confocal lens 25, the confocal pinhole 26 is provided. Accordingly, the confocal pinhole 26 is conjugated with the sample plane 18. As a result, only the observation light emitted from the focal point of the objective lens can pass through the confocal pinhole 26. In other words, observation light from which unnecessary light is excluded passes through the confocal pinhole 26.

The observation light that passes through the nonfocal pinhole 26 is limited to a predetermined wavelength by the barrier filter 27, and is subsequently detected by the photodetector 28 as typified by a photo multiplier. The number of photodetector 28 is not necessarily one. Upon separating the observation light by wavelength, a multi-channel detection may be performed by a plurality of photodetectors.

In the stimulation-use light path, the irradiation time of the laser light projected from the stimulation-use laser light source 29 is controlled by the stimulation-use shutter 30. Further, the beam diameter of the laser light is changed to an appropriate beam diameter by the beam diameter changing optical system 31, and the laser light is irradiated onto the tunable stop 32. At a subsequent stage of the tunable stop 32, the laser light condensing lens 34 is disposed. The tunable stop 32 is disposed at a front side focal point of the laser light condensing lens 34, and the stimulation-use scanning unit 35 is disposed at a back side focal point. Here, a galvanomirror or a photoelectric deflection element may be used as the stimulation-use scanning unit 35.

The stimulation-use scanning unit 35 is arranged at a front side focal point of the stimulation-use pupil projection lens 36, and the stimulation-use dichroic mirror 37 is provided at a subsequent stage of the stimulation-use pupil projection lens 36. The stimulation-use light path is coupled to the observation-use light path at the stimulation-use dichroic mirror 37. The stimulation-use pupil projection lens 36 functions together with the tube lens 23, and relays the image of the stimulation-use laser light source 29 formed on the stimulation-use scanning unit 35 to the pupil position 11 of the objective lens 7. That is, the stimulation-use scanning unit 35 is conjugated with the pupil position 17 of the objective lens 7, and thus the sample plane 18 is conjugated with the tunable stop 32.

As the tunable stop 32 is conjugated with the sample plane 18 in the above configuration, the irradiation area on the sample plane can be varied by changing the diameter of the tunable stop 32. Also, as the stimulation-use scanning unit 35 is located at a position conjugating with the pupil position 17 of the objective lens 7, the illumination position of the laser light on the sample plane is movable by deflecting the light with the stimulation-use scanning unit 35. Accordingly, for example, the irradiation area of the laser light (stimulation light) may be changed, or the position to which the laser light is irradiated may be changed from the center to the periphery while viewing the observation light (e.g., fluorescent light) from the sample plane due to the laser light from the observation-use laser light source 19 as well as the reflection light from the sample plane due to the laser light (stimulation light) from the stimulation-use laser light source 29 on the observation-use light path. Regarding the laser light, the beam diameter is changed by the beam diameter changing optical system 31, and only the area having an approximately constant intensity distribution of the laser light having Gaussian intensity distribution is extracted by the tunable stop 32. Accordingly, laser light of an approximately constant intensity distribution is irradiated onto the irradiation area. As described above, irradiation to an area and position suitable for the sample, with an almost uniform intensity on the sample plane is enabled.

Here, the following condition between beam diameter D of the laser light irradiated onto the tunable stop 32 and diameter A of the tunable stop is preferably satisfied:

$$A < D/2 \tag{1}$$

The beam diameter D of the laser light is defined as a diameter of the laser light with the greatest $1/e^2$ intensity. Further, the following condition is preferably satisfied:

$$A < D/(2.3) \tag{2}$$

Numerical examples of the present embodiment will now be described. The focal length of the tube lens 23 is 180 mm, the focal length of the pupil projection lens 36 is 50 mm, and the focal length of the laser light condensing lens 34 is 100 mm. Here, in order to irradiate an area of sample plane having a diameter of 5 μm by a 60× objective lens 7, the diameter of the tunable stop will be 0.6 mm. If a laser light with a beam diameter of 0.5 mm is used, the use of a 4× beam diameter changing optical system will convert the beam diameter of the laser light to 2.0 mm. In such a configuration, the ratio of the beam diameter D irradiated onto the tunable stop to the diameter A of the tunable stop is 3.33.

In the present configuration, pulsed laser light may be irradiated onto the sample plane 8 by the shutter periodically opening/closing. It is preferable that the light path from the laser light source be disposed appropriately by means of a mirror or the like. In the present embodiment, a laser may be introduced by means of an optical fiber or the like. It is to be noted that the mirror 38 plays the role of separating the light path for visual observations from the light path for laser scanning.

Third Embodiment

Figure 4:
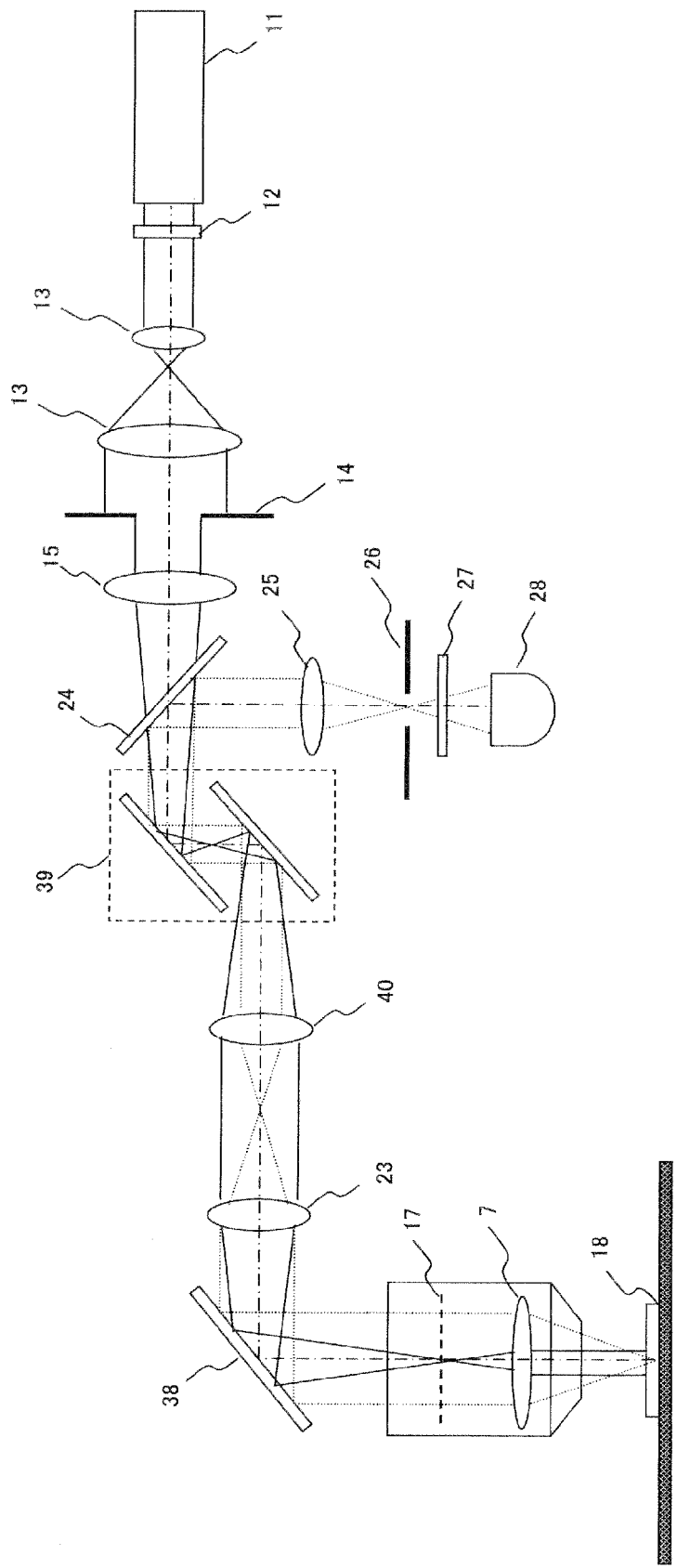
FIG. 4 is a schematic diagram illustrating a configuration of a laser scanning microscope according to one embodiment of the present invention.

FIG. 4 is a schematic diagram illustrating a configuration of a laser scanning microscope according to the present embodiment.

A laser introduction optical system in the laser scanning microscope of FIG. 4 includes a laser light source 11, a shutter 12, a beam diameter changing optical system 13, a tunable stop 14, a laser light condensing lens 15, a scanning unit 39, a pupil projection lens 40, a tube lens 23, and an objective lens 7, and irradiates the laser light onto the sample. The tunable stop 14 is a field stop in which the diameter of the stop is tunable. Alternatively, the tunable stop 14 may be an insertably and removably configured field stop. In this case, the diameter of the stop can be changed by replacing the field stop with a field stop of a different stop diameter. The beam diameter changing optical system 13 may be configured such that the magnification is tunable by means of the zoom lens. Also, the beam diameter changing optical system 13 itself may be insertably and removably configured such that the magnification can be changed by replacing the beam diameter changing optical system 13.

A detection optical system includes an excitation light-use dichroic mirror 24, a confocal lens 25, a confocal pinhole 26, a barrier filter 27, and a photodetector 28.

In the laser introduction optical system, the irradiation time of the laser light projected from the laser light source 11 is controlled by the shutter 12. Further, the beam diameter of the laser light is changed to an appropriate beam diameter by the beam diameter changing optical system 13, and the laser light is irradiated onto the tunable stop 14. At a subsequent stage of the tunable stop 14, the laser light condensing lens 15 is disposed. The tunable stop 14 is disposed at a front side focal point of the laser light condensing lens 15, and the scanning unit 39 is disposed at a back side focal point. For this scanning unit 39, a galvanomirror, a photoelectric deflection element, or the like may be used.

The stimulation-use scanning unit 39 is arranged at a front side focal point of the stimulation-use pupil projection lens 40. The pupil projection lens 40 functions together with the tube lens 23, and relays the image of the laser light source 11 formed on the scanning unit 39 to the pupil position 17 of the objective lens 7. That is, the scanning unit 39 is conjugated with the pupil position 17 of the objective lens 7, and thus the sample plane 18 is conjugated with the tunable stop 14.

A sample on the sample plane 18 to which the laser light is irradiated emits observation light. Here, the observation light is generally fluorescent light from the phosphor excited by the laser light. This observation light travels through the path of the laser light in the reverse direction, and reaches the excitation light-use dichroic mirror 24. Here, the observation light is also detected as the scanned information of the sample plane 18 as it passes through the observation-use scanning unit 21.

The observation light that reached the excitation light-use dichroic mirror 24 is separated from the laser light by the excitation light-use dichroic mirror 24, and is led to the confocal lens 25. At a back side focal point of the confocal lens 25, the confocal pinhole 26 is provided. Accordingly, the confocal pinhole 26 is conjugated with the sample plane 18. As a result, only the observation light emitted from the focal point of the objective lens can pass through the confocal pinhole 26. In other words, the observation light from which unnecessary light is excluded passes through the confocal pinhole 26.

As the tunable stop 14 is conjugated with the sample plane 18 in the above configuration, the irradiation area on the sample plane can be varied by changing the diameter of the tunable stop 14. Also, as the scanning unit 35 is located at a position conjugating with the pupil position 17 of the objective lens 7, the illumination position of the laser light on the sample plane is movable by deflecting the light with the scanning unit 35. Also, the beam diameter of the laser light is changed by the beam diameter changing optical system 13, and only an area of an approximately constant intensity distribution of the laser light having the Gaussian intensity distribution is extracted by the tunable stop 14. Accordingly, irradiation onto the irradiation area of the laser light with an approximately constant intensity distribution is enabled.

Here, the following condition between beam diameter D of the laser light irradiated onto the tunable stop 14 and diameter A of the tunable stop is preferably satisfied:

$$A < D/2 \tag{1}$$

The beam diameter D of the laser light is defined as a diameter of the laser light with the greatest $1/e^2$ intensity. Further, the following condition is preferably satisfied:

$$A < D/(2.3) \tag{2}$$

Moreover, the laser light condensing lens 15, the tunable stop 14, and the beam diameter changing optical system 13 may be insertably and removably arranged on a light path as an integrated unit. In this case, when the unit is inserted, irradiation of light stimulation onto the sample plane in the area set by the tunable stop is enabled. On the other hand, when the unit is removed, the light from the laser source can be scanned by the scanning unit 39, and the microscope can be used as an ordinary confocal laser scanning microscope in which the laser is condensed to the sample plane.

Numerical examples of the present embodiment will now be described. The focal length of the tube lens 23 is 180 mm, the focal length of the pupil projection lens 40 is 50 mm, and the focal length of the laser light condensing lens 15 is 80 mm. Here, in order to irradiate the area of a sample plane having a diameter of 5 μm by a 60× objective lens 7, the diameter of the tunable stop will be 0.48 mm. If a laser light with a beam diameter of 2.0 mm is used, the use of a 0.6× beam diameter changing optical system will convert the beam diameter of the laser light to 1.2 mm. In such a configuration, the ratio of the beam diameter D irradiated onto the tunable stop to the diameter A of the tunable stop is 2.5.

In the present configuration, pulsed laser light may be irradiated onto the sample plane 8 by the shutter periodically opening/closing. It is preferable that the light path from the laser light source be disposed appropriately by means of a mirror or the like. In the present embodiment, a laser may be introduced by means of an optical fiber or the like. It is to be noted that the mirror 38 plays the role of separating the light path for visual observations from the light path for laser scanning.

What is claimed is:

1. A microscope comprising, in order of position in a direction which laser light passes:
   a laser light source for emitting the laser light;
   an optical system which changes a beam diameter of the laser light incident as parallel light;
   a field stop disposed at a position conjugating with a sample plane, wherein laser light which is parallel light passing through the optical system is incident to the field stop;
   a dichroic mirror for guiding, to the sample plane, (i) laser light passing through the field stop, and (ii) light from the sample plane to a detection light path;
   a lens disposed between the field stop and the dichroic mirror; and
   a mirror disposed between the field stop and the dichroic mirror,
   wherein:
   the field stop is disposed at a front side focal point of the lens, and the mirror is disposed at a back side focal point of the lens,
   the optical system and the field stop are disposed on an illumination light path, and
   the following conditional equation is satisfied:

$$A \leq D/2$$

where "A" is a diameter of the field stop and "D" is a beam diameter of light from the optical system and incident to the field stop.

2. The microscope according to claim 1, wherein an angle of the mirror is variable.

3. The microscope according to claim 1, wherein the mirror is a second dichroic mirror.

4. A microscope comprising, in order of position in a direction which laser light passes:
   a laser light source for emitting the laser light;
   an optical system which changes a beam diameter of the laser light incident as parallel light;
   a field stop disposed at a position conjugating with a sample plane, wherein laser light which is parallel light passing through the optical system is incident to the field stop;
   a dichroic mirror for guiding, to the sample plane, (i) laser light passing through the field stop, and (ii) light from the sample plane to a detection light path;
   a lens disposed between the field stop and the dichroic mirror; and
   a scanning unit disposed between the field stop and the dichroic mirror, the scanning unit being for scanning light from the laser light source,
   wherein:
   the field stop is disposed at a front side focal point of the lens, and the scanning unit is disposed at a back side focal point of the lens,
   the optical system and the field stop are disposed on an illumination light path, and
   the following conditional equation is satisfied:

$$A \leq D/2$$

where "A" is a diameter of the field stop and "D" is a beam diameter of light from the optical system and incident to the field stop.

5. The microscope according to claim 4, wherein the scanning unit is a galvanomirror.

6. The microscope according to claim 4, further comprising a photodetector which is disposed on the detection light path and which detects light from the sample plane, wherein the microscope is a laser scanning microscope.

7. The microscope according to claim 6, further comprising a confocal pinhole disposed on the detection light path at a position conjugating with the sample plane.

8. A laser scanning microscope including a photodetector which detects light from a sample plane, the laser scanning microscope comprising:
   an observation-use laser light source for emitting laser light, and a stimulation-use laser light source for emitting laser light;
   an optical system disposed on a stimulation-use light path, the optical system changing a beam diameter of the laser light from the stimulation-use laser light source;
   a field stop disposed at a position on the stimulation-use light path which is conjugate with the sample plane, the laser light from the stimulation-use laser light source being incident to the field stop;
   an observation-use galvanomirror for scanning with the laser light from the observation-use laser light source, and a stimulation-use galvanomirror for scanning with the laser light from the stimulation-use laser light source; and
   a first lens disposed between the observation-use laser light source and the observation-use galvanomirror, and a second lens disposed at a subsequent stage of the field stop with respect to the stimulation-use laser light source;
   wherein the field stop is disposed at a front side focal point of the second lens,
   wherein the stimulation-use galvanomirror is disposed at a back side focal point of the second lens, and
   wherein the following conditional equation is satisfied:

$$A \leq D/2$$

where "A" is a diameter of the field stop and "D" is a beam diameter of laser light incident to the field stop.

9. The microscope according to claim 8, wherein the optical system, the field stop, and the second lens are integrated, and are insertable and removable from the stimulation-use light path.

* * * * *